United States Patent
Satterfield

(10) Patent No.: US 7,261,266 B2
(45) Date of Patent: Aug. 28, 2007

(54) DEPLOYABLE VIDEO ARM

(76) Inventor: Johnny A. Satterfield, 26543 Brooks Cir., Stevenson Ranch, CA (US) 91381

( * ) Notice: Subject to any disclaimer, the term of this patent is extended or adjusted under 35 U.S.C. 154(b) by 25 days.

(21) Appl. No.: 11/097,662

(22) Filed: Mar. 31, 2005

(65) Prior Publication Data
US 2006/0219857 A1 Oct. 5, 2006

(51) Int. Cl.
*E04G 3/00* (2006.01)

(52) U.S. Cl. ............... 248/284.1; 248/286.1; 297/217.3

(58) Field of Classification Search ......... 248/284.1, 248/280.11, 584, 278.1, 279.1, 286.1; 297/188.16, 297/217.3, 188.05, 117; 224/281, 282; 312/237
See application file for complete search history.

(56) References Cited

U.S. PATENT DOCUMENTS

| 4,647,980 | A | | 3/1987 | Steventon et al. |
|---|---|---|---|---|
| 5,000,511 | A | | 3/1991 | Shichijo et al. |
| 5,076,524 | A | * | 12/1991 | Reh et al. ............ 248/296.1 |
| 5,177,616 | A | | 1/1993 | Riday |
| 5,179,447 | A | | 1/1993 | Lain |
| 5,195,709 | A | | 3/1993 | Yasushi |
| 5,311,302 | A | * | 5/1994 | Berry et al. ............ 348/14.03 |
| 5,850,997 | A | | 12/1998 | Rosen |
| 6,007,036 | A | * | 12/1999 | Rosen .................. 248/286.1 |
| 6,179,263 | B1 | * | 1/2001 | Rosen et al. ............ 248/278.1 |
| 7,040,699 | B2 | * | 5/2006 | Curran et al. ............ 297/217.3 |
| 2002/0066392 | A1 | * | 6/2002 | Calam et al. ............ 108/33 |

* cited by examiner

*Primary Examiner*—Ramon O Ramirez
(74) *Attorney, Agent, or Firm*—Venable, LLP

(57) ABSTRACT

A video monitor support movable between stowed and deployed positions includes a base attachable to a surface and a carriage fixed to the base. The carriage includes a shaft extendible between the stowed and deployed positions. A constant linear force is applied to the shaft between the stowed and deployed positions, and a mount is fixed to the shaft opposite the carriage for supporting a video monitor.

20 Claims, 5 Drawing Sheets

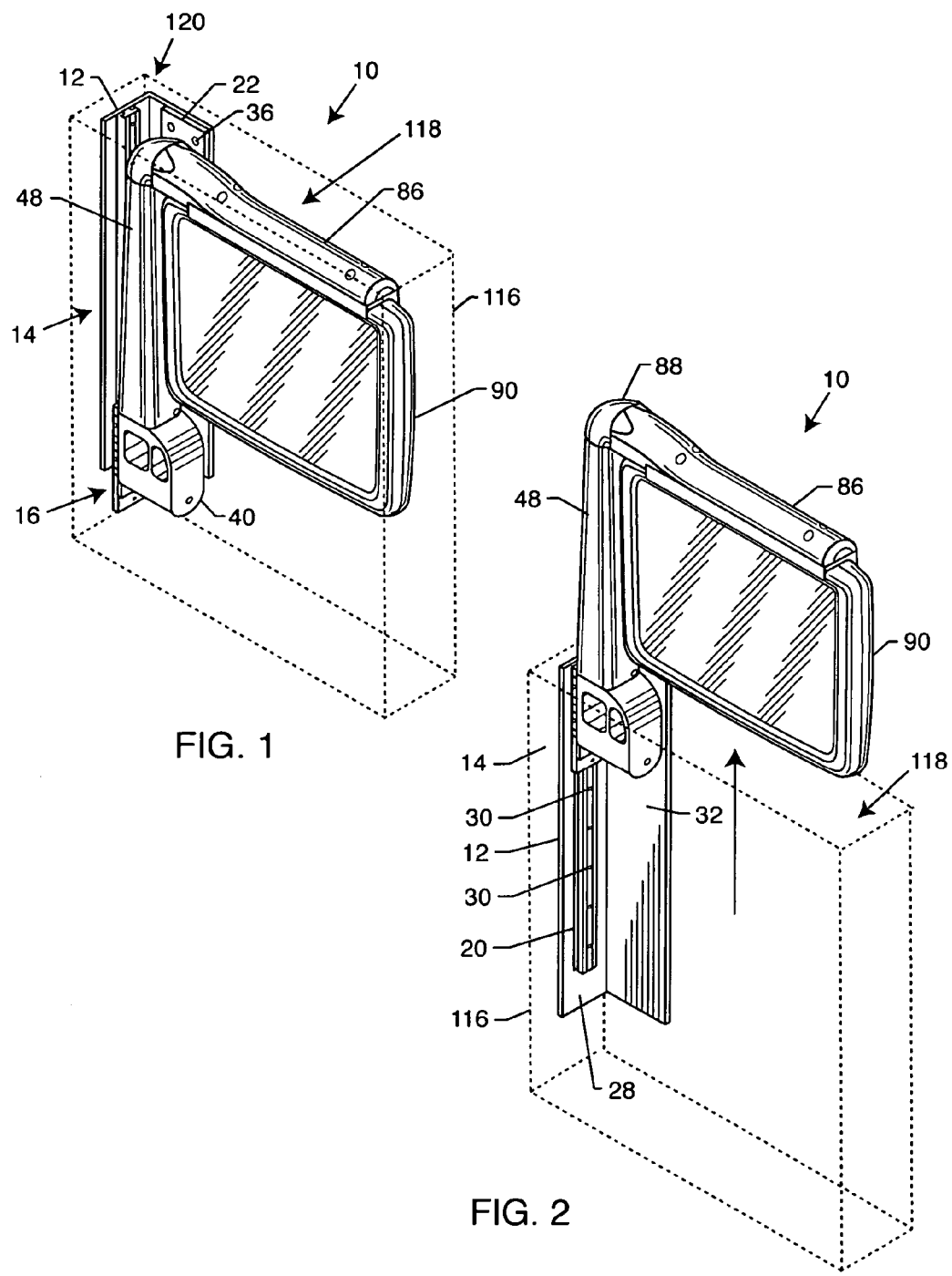

US 7,261,266 B2

DEPLOYABLE VIDEO ARM

BACKGROUND OF THE INVENTION

The present invention relates generally to support arms. More particularly, the present invention relates to a video monitor support arm.

With each passing year, commercial airline companies are continuously striving to provide improved services for their customers as well as improving passenger comfort and convenience. On many airlines, it is standard for each passenger to have their own personal video display monitor associated with their chair or seat to provide the passenger with in-flight entertainment and/or information. As a matter of safety and convenience, the screen must be easily stored and retracted.

Many different types of supports have been proposed to provide a video display monitor that can be stowed when not in use. However, such supports have their limitations. For example, U.S. Pat. No. 5,000,511 discloses an apparatus for attaching a display monitor to a seat. However, this apparatus relies on the use of pivoting mechanical linkages to deploy the monitor that may interfere with the comfort of a neighboring passenger and these linkages are subject to mechanical wear, breakdown and require maintenance. In another example, U.S. Pat. No. 5,177,616 discloses a stowable video display assembly. However, this assembly requires a good deal of effort, space and movement by the passenger to move the display from its stowed position for viewing by the passenger. In an additional example, U.S. Pat. No. 5,195,709 discloses a television receiver supporting structure of an arm rest. However, this support also relies on the use of pivoting mechanical linkages to deploy the television receiver and these linkages are subject to mechanical wear, breakdown and require maintenance. Other prior art systems are also impractical for one or all of the following factors: expense of manufacture and installation; complexity; durability; required level of maintenance; inefficiency; and compromise of space available for meal trays and various control switches used for reading lights, alerting a flight attendant and the like.

While devices such as the ones described above may provide means of providing supports for video monitors, such devices can always be improved.

Accordingly, there is a need for a video monitor support movable between stowed and deployed positions that requires a minimal amount of space during storage and deployment. There is a need for a video monitor support that employs an automatic deployment mechanism that at least partially deploys the support without pivoting the support. The present invention satisfies these needs and provides other related advantages.

SUMMARY OF THE INVENTION

The present invention is a video arm that supports and deploys a video display monitor, such as a flat panel monitor, of the type typically found on passenger aircraft, trains, cars and other vehicles. In these environments, space is extremely limited, thereby requiring a compact, easy to use system to deploy the monitors. The present invention is designed to reduce the required space by employing a unique and simple deployment mechanism to move the monitor between a stowed position and a deployed position. The deployment mechanism allows the support to be at least partially deployed from the stowed position without pivoting the support.

A video monitor support movable between stowed and deployed positions includes a base attachable to a surface and a carriage fixed to the base. The carriage includes a shaft extendible between the stowed and deployed positions. A constant linear force is applied to the shaft between the stowed and deployed positions, and a mount is fixed to the shaft opposite the carriage for supporting a video monitor.

Application of the constant linear force to the shaft is related to moving the shaft between the stowed and deployed positions. The movement of the shaft involves a rail operatively engaging the carriage, and a constant force spring disposed near an end of the rail. The constant force spring is operatively connected to the carriage, pulling the carriage along the rail, and moving the shaft between the stowed and deployed positions. A brake is used for controlling speed of the carriage along the rail as the shaft travels between the stowed and deployed positions.

The video monitor support includes a means for preventing travel of the shaft in a first direction between the stowed and deployed positions as well as a way of selectively disengaging that preventing means. In one embodiment of the present invention, travel of the shaft in the first direction is prevented via a latch that engages the carriage. Likewise, one way of selectively disengaging the preventing means involves a button operatively connected to the latch for pivoting the latch to disengage from the carriage. The disengagement of the latch from the carriage allows the shaft to move between the stowed and deployed positions.

The video monitor support includes a spring strap clutch disposed between the mount and the shaft to resist movement of the mount relative to the shaft. The support also includes a spring strap clutch disposed between the shaft and the carriage to resist movement of the shaft relative to the carriage.

The constant linear force is achieved via a rolled spring and a spring drum operatively connected to the carriage that cooperate to position the shaft between the stowed and deployed positions as the spring, attached on one end to the spring drum, rolls about the spring drum.

In an embodiment of the present invention, the shaft is disposed within a housing having an open end in the stowed position. The shaft extends through the open end of the housing in the deployed position. The rail is connected to a side of the housing and operatively engages the carriage. A constant force spring connected to the housing near an end of the rail is operatively connected to the carriage for pulling the carriage along the rail, moving the shaft between the stowed and deployed positions. A brake controls the speed of the carriage along the rail as the shaft travels between the stowed and deployed positions.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a perspective view of a video monitor support embodying the present invention shown in a stowed position in a housing;

FIG. 2 is a perspective view of the video monitor support of FIG. 1 shown in a partially deployed position;

DETAILED DESCRIPTION OF THE PREFERRED EMBODIMENT

Figure 3:
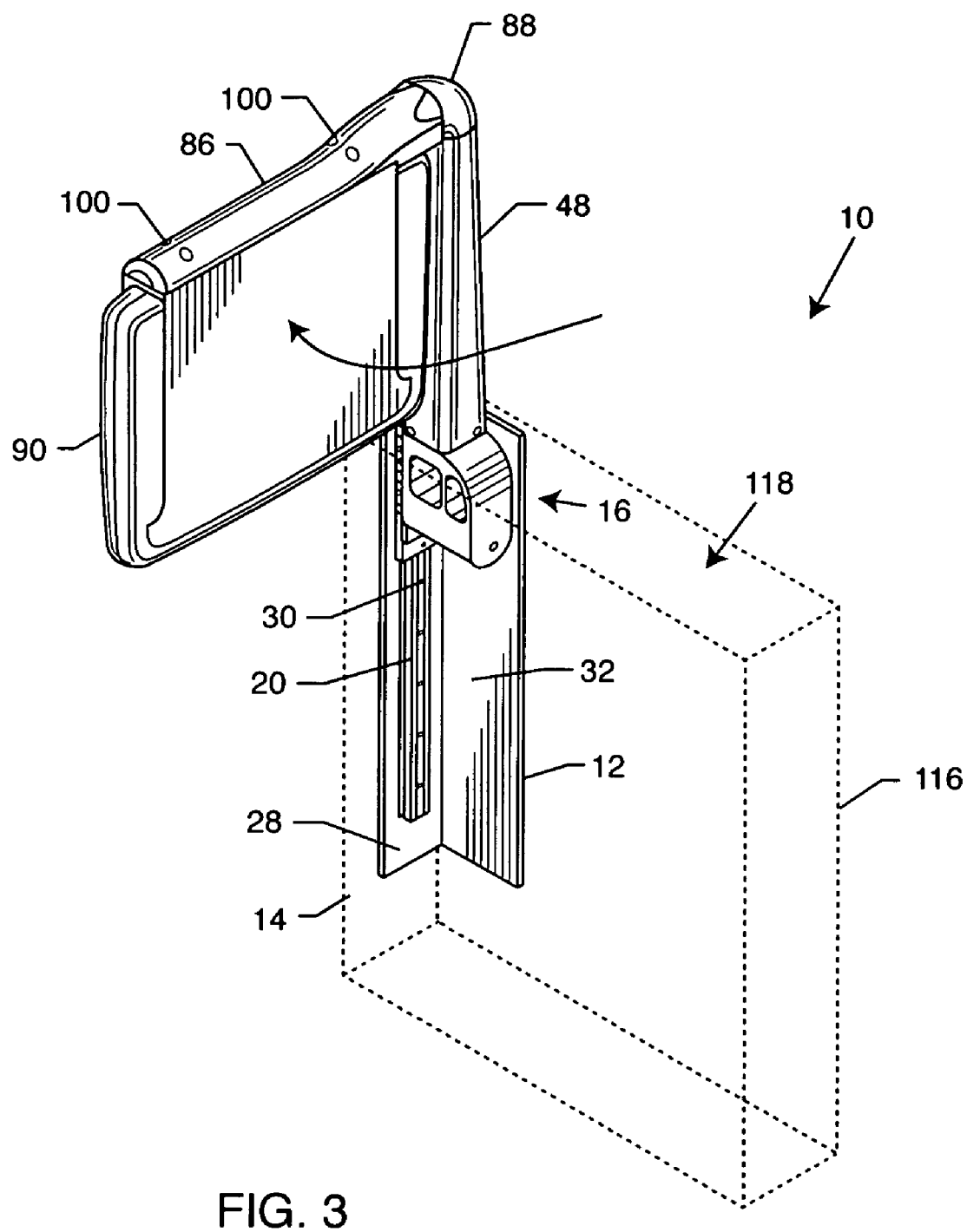
FIG. 3 is a perspective view of the video monitor support of FIG. 1 shown in the partially deployed position of FIG. 2 but with the video monitor rotated ninety degrees about a shaft of the support.

As shown in FIGS. 1-7 for purposes of illustration, the present invention resides in a video monitor support 10 movable between stowed and deployed positions. The support 10 includes a support structure or base 12 which acts as the main structural support for the entire video monitor support 10. The base 12 may come in various forms including, without limitation, an L-shaped bracket or the like.

The base 12 is attachable to a surface 14 and a carriage assembly 16 is fixed to the base 12. The surface 14 may be a surface on a vehicle (e.g., aircraft) bulkhead, an exterior side of a vehicle chair (not shown) or a side of a console housing or compartment located next to or part of the vehicle passenger chair.

The base 12 holds a rail 20 and one end of a laminated, rolled, constant force spring 22. The spring 22 may come in various forms including, but not limited to, two thin constant force springs placed one on top of the other and then coiled up together. Aligned apertures 24, 26 on the rail 20 and base 12, respectively, allow the rail 20 to be secured to a side 28 of the base 12 by fasteners 30 that extend through the apertures 24, 26. The spring 22 is connected to another side 32 of the base 12 by fasteners 34 when the fasteners 34 are extended through apertures 36 on the spring 22 and apertures (not shown) on the base 12 that are aligned.

The carriage assembly 16 is fixed to the base 12 in that the carriage assembly 16 engages and moves along the rail 20 between the stowed and deployed position. The carriage assembly 16 is made up of several components that include a partially hollow knuckle mount 40, two slide/guide blocks 42, a brake 44, a spring drum assembly 46 and a hollow arm shaft 48. The rail 20 may come in various forms including, without limitation, a T-shape, an I-shape or any shape that includes flanges 50 that extend from opposite sides of a central portion 52 of the rail 20. The carriage assembly 16 engages the rail 20 via the guide blocks 42 as the guide blocks 42 each include a groove or slot 54 that is sized and shaped to engage the flanges 50 of the rail 20 while allowing the guide blocks 42 to slidingly move along the rail 20. The guide blocks 42 and rail 20 work in conjunction to allow the carriage assembly 16 to traverse back and forth (or up and down depending on the orientation of the rail 20) along the rail 20. The brake 44 is connected to the guide blocks 42 and engages the rail 20, using friction to slow the guide blocks 42 as the spring 22 pulls the guide blocks 42 along the rail 20 towards the deployed position.

The knuckle mount 40 is connected to the guide blocks 42 and serves as an attachment base for the arm shaft 48 and spring 22. The knuckle mount 40 includes a semi-cylindrical recess 56 for receiving the spring drum assembly 46 that is connected to the spring 22. The spring drum 46 includes a cylinder 58 having an annular flange 60 extending outwardly from the cylinder 58 on one end of the cylinder 58, an axle 62, and a disk-shaped flange 64 positioned adjacent the cylinder 58 on an end of the cylinder 58 opposite the flange 60. The spring drum 46 is connected to the knuckle mount 40 of the carriage 16 when the cylinder 58 and flange 64 are fixed within the recess 56 by inserting the axle 62 through aligned apertures 66, 68 of the knuckle mount 40 and flange 64, a central shaft 69 that extends through the cylinder 58 and another aperture (not shown) on the knuckle mount 40 aligned with, and on the opposite side of the knuckle mount 40 from, the other aperture 66. When the axle 62 is fastened in position, the spring drum 46 is connected to the knuckle mount 40 and the cylinder 58 is rotatable about the axle 62.

Deployment of the arm shaft 48 is achieved by attaching an internal diameter of one end of the constant force spring 22 to the cylinder 58 of the spring drum 46. The spring 22 and the spring drum 46 cooperate to provide the constant linear force that moves the carriage 16 along the rail 20 (i.e., moving the arm shaft 48 between the stowed and deployed positions) as the spring 22, attached on one end to the spring drum 46, rolls about the cylinder 58 of the spring drum 46 and pulls the carriage 16 (and arm shaft 48) towards the deployed position. The flanges 60, 64 act as guides to prevent the spring 22 from sliding beyond the ends of the cylinder 58.

The hollow arm shaft 48 is rotatably mounted to and extends upwardly from the knuckle mount 40 in an orientation generally parallel to the orientation of the rail 20 on the base 12. As outlined above, one end of the spring 22 is connected to the spring drum 46 and the other end of the spring 22 is connected to the base 12 adjacent an end of the rail 20. Application of the constant linear force provided by the spring 22 to the knuckle mount 40 pulls the shaft 48 (via the carriage 16) from one end of the rail 20 to the other end of the rail 20 (i.e., between the stowed and deployed positions). The brake 44 controls the speed of the carriage 16 along the rail 20 as the carriage 16 (to which the arm shaft 48 is attached) travels between the ends of the rail 20. The speed of the deployment is controlled by the brake 44 frictionally contacting the rail 20, which partially counters the pull of the spring 22 and slows the rise of the carriage 16 along the rail 20.

The video monitor support 10 includes a mechanism for preventing travel of the shaft in a first direction 70 (i.e., from the stowed position to the deployed position). The mechanism 70 may come in various forms including, without limitation, a latch assembly or the like. The latch assembly 70 includes a stationary, spring-loaded latch 72 mounted on a pivot axle 74. The pivot axle 74 extends outwardly from a base 76 mounted to a surface 78. In the stowed position, the latch 72 engages a rod 79 extending outwardly from the knuckle mount 40 of the carriage 16. The engagement of the latch 72 and rod 79 prevents the carriage 16 from being pulled towards the deployed position by the spring 22. The latch 72 can be selectively disengaged by a mechanism 80, allowing the carriage 16 to travel along the rail 20 towards the deployed position. The mechanism 80 includes a button 82 operatively connected to the latch 72 by a mechanical linkage 84. Pressing the button 82 moves the linkage 84 which, in turn, pivots the latch 72 away from the rod 79, disengaging the latch 72 from the rod 79 and freeing the carriage 16 to travel along the rail between the stowed and deployed positions. When the latch 72 is released, the spring 22 will coil upon itself around the spring drum 46 and cause the carriage assembly 16 to rise upwardly along the rail 20 from one end of the rail 20 to the other (i.e., the stowed position to the deployed position). In the alternative, the mechanism 80 may disengage the latch 72 and rod 79 by a passenger pushing downwardly on the arm shaft 48 or other portion of the support 10 operatively connected to the latch 72 (via the linkage 84) which, in turn, pivots the latch 72 away from the rod 79, disengaging the latch 72 from the rod 79. Once the spring-loaded latch 72 is disengaged from the rod 79 and the carriage 16 moves away from the stowed position, the latch 72 will automatically pivot back to the position the latch 72 was in when the latch 72 engaged the rod 79. However, the latch 72 will not engage the rod 79 as the rod 79 has moved with the carriage 16 away from the stowed position.

A hollow tubular monitor base or mount 86 is rotatably fixed to the arm shaft 48 opposite the knuckle mount 40. A hollow elbow 88 is disposed on an end of the arm shaft 48, between the arm shaft 48 and the mount 86. The mount 86 is the attachment point for a video monitor 90 (e.g., a flat panel monitor such as a Liquid Crystal Display (LCD) screen) operatively connected to the mount 86 by fasteners (not shown) such as screws or the like. The mount 86 extends outwardly from the elbow 88 and perpendicular to the arm shaft 48. The mount 86 (along with the monitor 90) rotates about a horizontal axis 92 of the arm shaft 48 and acts as the final deployment element for viewing position adjustment. In the alternative, the elbow 88 is of unitary construction with the arm shaft 48. In another alternative, the elbow 88 rotates about the horizontal axis 92. In order to provide length to allow for more compact stowage, the monitor 90 is rotatable about the horizontal axis 92 in order to be stowed upside down, thereby allowing the monitor 90 to be in a higher position upon full deployment. The arm shaft 48 can be much shorter if the monitor 90 is to be stowed right side up but will result in lower height upon full deployment.

The monitor 90 includes a flat mounting section 94 at a bottom 96 of the monitor 90. The mounting section 94 is positioned adjacent to a flat mounting section 98 on the mount 86. The monitor 90 is fixed to the mount 86 by fasteners (not shown) extending through apertures 100 on the mount 86 that are aligned with apertures (not shown) on the flat mounting section 94 of the monitor 90.

The video monitor support 10 includes a mount clutch assembly 102 disposed between the mount 86 and the elbow 88 of the arm shaft 48 to resist movement of the mount 86 relative to the arm shaft 48 as the mount 86 rotates about the horizontal axis 92 of the arm shaft 48. The support 10 also includes a knuckle clutch assembly 104 disposed between the arm shaft 48 and the knuckle mount 40 to resist movement of the arm shaft 48 relative to the knuckle mount 40 as the arm shaft 48 rotates about a vertical axis 106 of the arm shaft 48. As outlined above, the arm shaft 48 is attached to the carriage assembly 16 via the knuckle clutch assembly 104 which provides rotational resistance when attached to the arm shaft 48 on the carriage assembly 16. The elbow 88 (along with the arm shaft 48) rotates about the vertical axis 106 of the arm shaft 48 and acts as a secondary deployment element.

Upon full deployment, the support 10 must properly support the monitor 90 as the vehicle moves, thereby requiring resistance at all stages of deployment. The clutch assemblies 102, 104 are designed to maintain three to seven pounds of resistance in order to not only support the monitor 90, but to allow the monitor 90 to be easily adjusted by the passenger as well as maintain that adjustment once made. Each clutch assembly 102, 104 includes, respectively, a hollow cylindrical mounting tube shaft 108, 110 and a clutch 112, 114, and a spring strap 113, 115. The spring strap 113, 115 exerts spring force to the clutch 112, 114, as the clutch 112, 114 wraps around its respective tube shaft 108, 110, to press the clutch 112, 114 against the tube shaft 108, 110 to create rotational resistance as the clutch 112, 114 rotates about the tube shaft 108, 110. Each of the tube shafts 108, 110 includes a central aperture 109, 111 through which electrical wiring passes.

The clutch assemblies 102, 104 are assembled together in similar, if not identical, manner. The tube shaft 110 is connected to the knuckle mount 40 via fasteners (not shown). The clutch 114 is disposed within the hollow arm shaft 48 between the internal wall of the arm shaft 48 and the tube shaft 110. The spring strap 115 is a U-shaped flexible clip with legs 117 that curve inwardly to grip a slot 119 of the clutch 114 to press the clutch 114 against the tube shaft 110. The spring strap 115 is disposed between the slot 119 of the clutch 114 and the internal wall of the arm shaft 48. The clutch 114 is positioned around the tube shaft 110 while still relatively loose and the spring strap 115 is then positioned within the slot 119 to press the clutch 114 against the exterior of the tube shaft 110. The end of the arm shaft 48 is then positioned around the tube shaft 110, clutch 114 and spring strap 115. The arm shaft 48 is held in position by fasteners (not shown) that extend through apertures 121 on the arm shaft 48 and aligned apertures 123 on the clutch 114, thereby operationally connecting the arm shaft 48 to the knuckle mount 40. The arm shaft 48, now secured to the clutch 114, rotates about the tube shaft 110, with the clutch 114 providing rotational resistance due to the spring force exerted by the spring strap 115 against the clutch 114. Once secured around the tube shaft 110, the clutch 114 rotates about the tube shaft 110 but cannot move past a lip 125 of the tube shaft 110, thereby securing the arm shaft 48 to the knuckle mount 40 since the arm shaft 48 is connected to the clutch 114.

Likewise, the tube shaft 108 is connected to the elbow 88 at the end of the arm shaft 48 via fasteners (not shown). The clutch 112 is disposed within the hollow mount 86 between the internal wall of the mount 86 and the tube shaft 108. The spring strap 113 is a U-shaped flexible clip with legs 126 that curve inwardly to grip a slot 128 of the clutch 112 to press the clutch 112 against the tube shaft 108. The spring strap 113 is disposed between the slot 128 of the clutch 112 and the internal wall of the mount 86. The clutch 112 is positioned around the tube shaft 108 while still relatively loose and the spring strap 113 is then positioned within the slot 128 to press the clutch 112 against the exterior of the tube shaft 108. The end of the mount 86 is then positioned around the tube shaft 108, clutch 112 and spring strap 113. The mount 86 is held in position by fasteners (not shown) that extend through apertures (not shown) on the mount 86 and aligned apertures (not shown) on the clutch 112, thereby operationally connecting the mount 86 to the elbow 88 on the end of the arm shaft 48. The mount 86, now secured to the clutch 112, rotates about the tube shaft 108, with the clutch 112 providing rotational resistance due to the spring force exerted by the spring strap 113 against the clutch 112. Once secured around the tube shaft 108, the clutch 112 rotates about the tube shaft 108 but cannot move past a lip 134 of the tube shaft 108, thereby securing the mount 86 to the elbow 88 on the end of the arm shaft 48 since the mount 86 is connected to the clutch 112.

In an embodiment of the present invention, the base 12 and carriage assembly 16 (including the arm shaft 48) are disposed within a housing 116 having an open end 118 in the stowed position. The arm shaft 48 extends through the open end 118 of the housing 116 in the deployed position. The rail 20 is connected to the surface 14 of a side of the housing 116 (via the base 12) and is connected to the carriage assembly 16 in the manner outlined above. The constant force spring 22, connected on one end to the housing 116 (via the base 12) near an end of the rail 20, is connected on an opposite end to the knuckle mount 40 of the carriage 16 (via the spring drum 46) in the manner outlined above for pulling the carriage 16 along the rail 20 (i.e., moving the arm shaft 48 between the stowed and deployed positions). The L-shaped base 12 may be located in a corner 120 of the housing 116.

Figure 4:
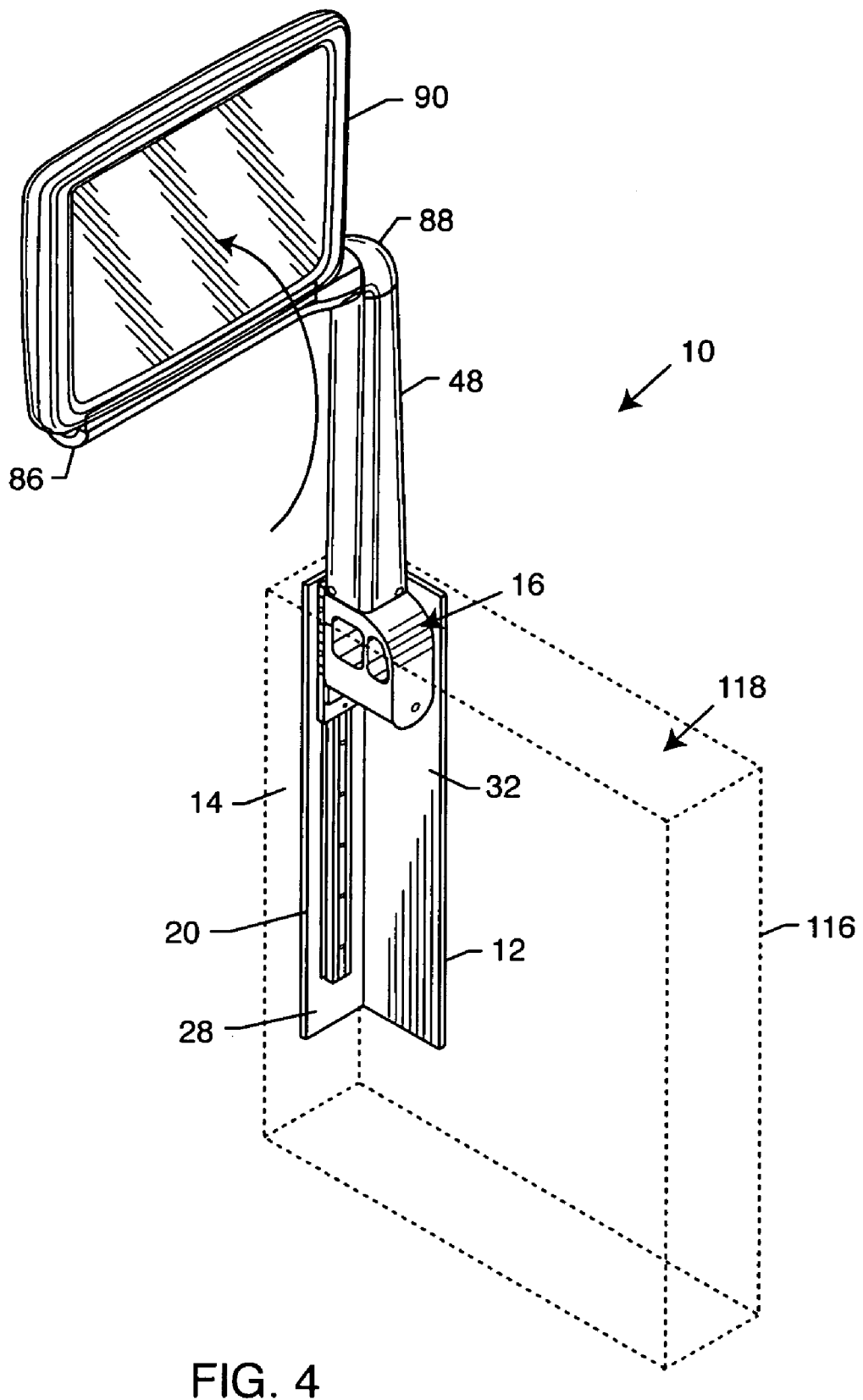
FIG. 4 is a perspective view of the video monitor support of FIG. 1 shown in a fully deployed position with the video monitor rotated one hundred eighty degrees about a mount of the support from the position of the video monitor illustrated in FIG. 3.
Figures 5, 6:
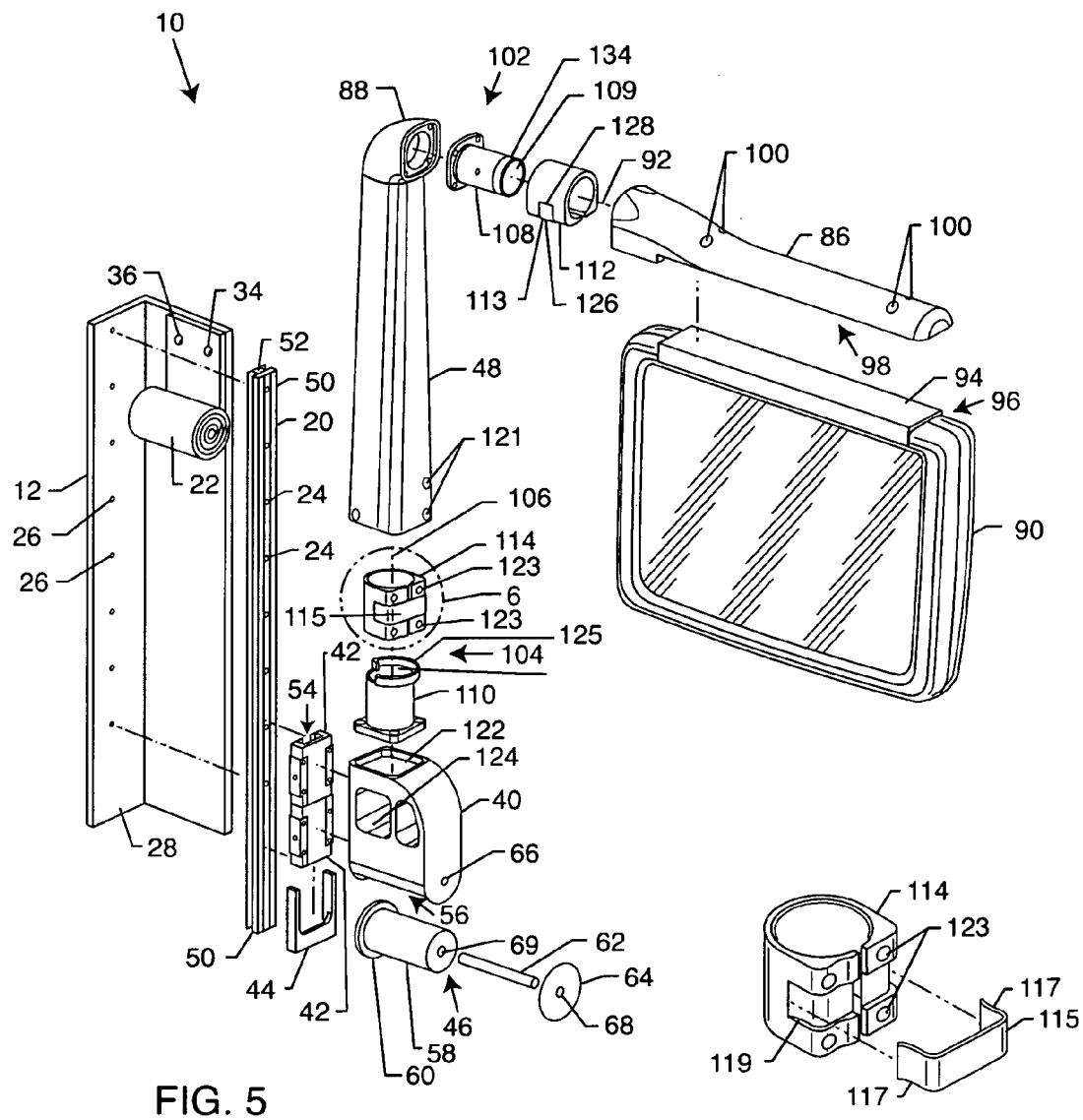
FIG. 5 is an exploded perspective view of the video monitor support of FIG. 1.
FIG. 6 is an enlarged exploded view of a clutch and spring strap taken along line 6 of FIG. 5.
Figure 7:
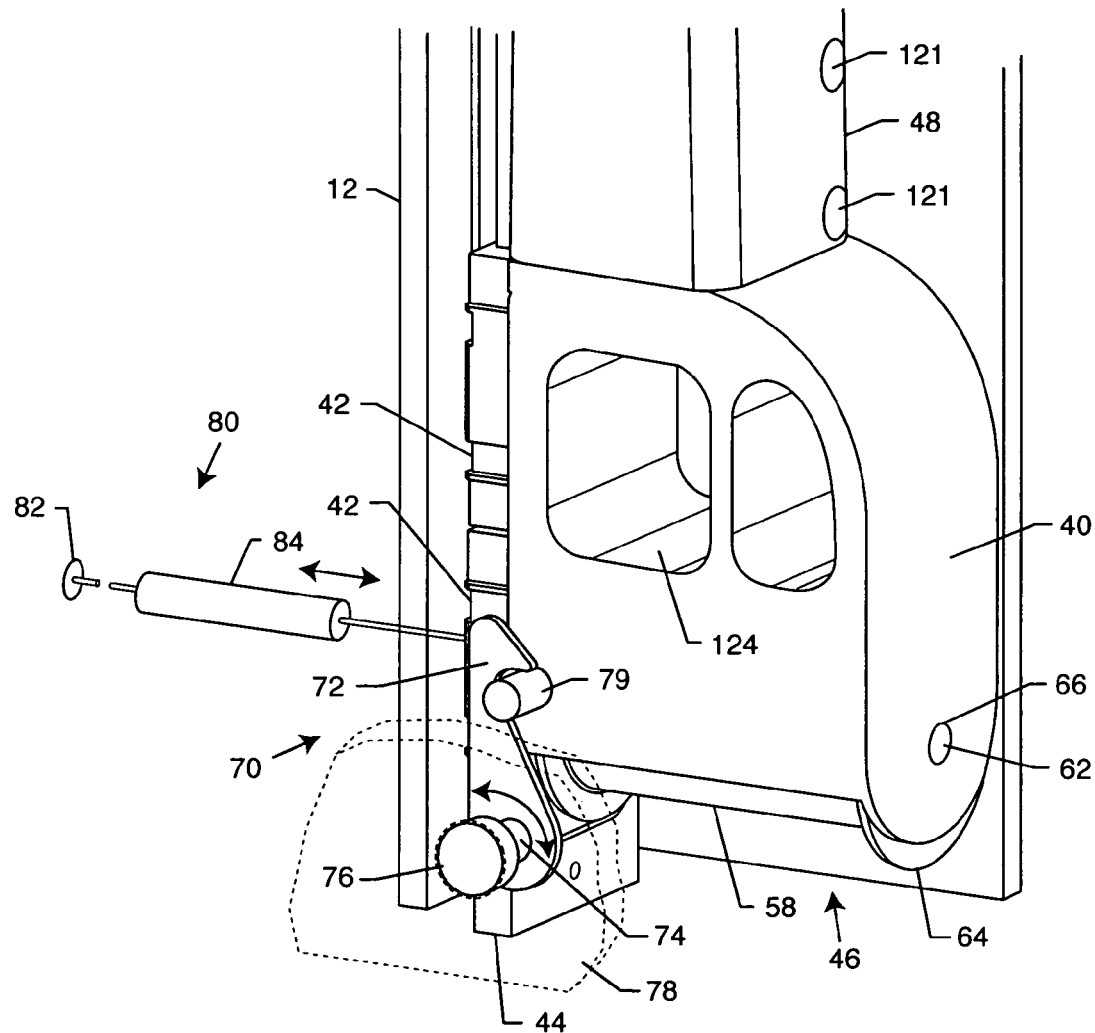
FIG. 7 is a perspective view of a portion of the video monitor support of FIG. 1 illustrating a latch connected to a surface where the latch engages the support to prevent deployment thereof, and a mechanism to disengage the latch from the support.

In use, the deployment stages required to bring a monitor 90 to proper viewing position are as follows: stowed position (FIG. 1), initial deployment (FIG. 2), secondary deployment (FIG. 3), and final deployment (FIG. 4). In the stowed position, the monitor 90 is contained in a housing or console 116, in a space between passenger chairs, or in a space between a passenger chair and a bulkhead (see FIG. 1). In any event, the monitor 90 is out of sight of the passenger. In the initial deployment, the monitor 90 is raised vertically from within the housing 116 or space where it is stowed after either pushing a remote mechanical button 82 operationally connected to the support 10, or by pressing down on top of the monitor 90, activating a release mechanism, as outlined above. Pushing the button 82 or the monitor 90 releases the latch 72 and allows the spring 22 to pull the carriage 16 upwards along the rail 20 so that the arm shaft 48 is fully extended from the stowed position (see FIG. 2). In secondary deployment, the passenger swings the monitor 90 about the vertical axis 106 of the arm shaft 48, bringing the monitor 90 into the viewing plane of the passenger, but with the back of the monitor 90 facing the passenger (see FIG. 3). In the final deployment, the passenger adjusts the monitor 90 in the forward or aft direction, by swinging the monitor 90 about the horizontal axis 92, to bring the monitor 90 to the most comfortable viewing position (see FIG. 4).

In the alternative, a reading light (not shown) may be connected to the bottom 96 of the mount 86 so that the passenger can read a magazine, newspapers, a book or the like while also viewing the screen of the monitor 90.

The monitor 90 is electrically connected to the wiring system of the aircraft via an electrical wire harness (not shown). This wire harness is run from the monitor 90 through the hollow interiors of the mount 86, clutch assembly 102 (via aperture 109 of the tube shaft 108), elbow 88, arm shaft 48, clutch assembly 104 (via aperture 111 of the tube shaft 110), and apertures 122, 124 of the knuckle mount 40 to where the wire harness connects to the wiring system of the aircraft. The passenger can control which channel the monitor 90 is set to via controls (not shown) located on the passenger's chair that are electrically connected to the monitor 90 via the wiring system and monitor wire harness.

In the present invention, space is achieved by eliminating the arms, levers and the like which are required when using linkages or scissor lift deployment methods. The present invention also has fewer moving parts resulting in lower maintenance costs and increased reliability. Quieter operation is also achieved as there is no hissing noise from a gas spring. The use of the rolled spring 22 and spring drum 46, rather than the traditional gas spring/linkage system, allows for more room in the housing 116 where space is a premium.

The clutching mechanisms in the second and final deployment stages are also unique in that they allow for large diameter electrical harnesses to pass through the hollow elements of the carriage assembly 16, elbow 88 and mount 86. This is achieved by using the spring strap 113, 115 to tighten the clutch 112, 114, respectively, around the mount 86 and arm shaft 48, thereby providing friction force necessary to maintain the industry standard of three to seven pounds of rotational resistance. Conventional clutches use small screws to tighten the clutches but doing so requires the internal diameter of the tube shafts to be smaller which is less desirable. Additionally, there is no need to adjust the clutches 112, 114 of the present invention since the resistance force is achieved via spring force provided by the spring straps 113, 115.

Although the present invention has been discussed above in connection with use on a passenger aircraft, the present invention is not limited to that environment and may also be used on passenger trains, cars and other vehicles.

Although at least two embodiments have been described in detail for purposes of illustration, various modifications may be made without departing from the scope and spirit of the invention.

What is claimed is:

1. A video monitor support movable between stowed and deployed positions, comprising: a base attachable to a surface; a carriage fixed to the base and including a shaft extendible between the stowed and deployed positions; means for applying a constant linear force to the shaft between the stowed and deployed positions; and a mount fixed to the shaft opposite the carriage for supporting a video monitor.

2. The support of claim 1, wherein the constant linear force means includes means for moving the shaft between the stowed and deployed positions.

3. The support of claim 1, wherein the shaft is disposed within a housing having an open end in the stowed position, the shaft extending through the open end of the housing in the deployed position.

4. The support of claim 2, wherein the constant linear force means includes a brake for controlling speed of the carriage along a rail as the shaft travels between the stowed and deployed positions.

5. The support of claim 1, including means for preventing travel of the shaft in a first direction between the stowed and deployed positions; and means for selectively disengaging the preventing means.

6. A video monitor support movable between stowed and deployed positions, comprising: a base attachable to a surface; a carriage fixed to the base and including a shaft extendible between the stowed and deployed positions; means for applying a constant linear force to the shaft between the stowed and deployed positions; a mount fixed to the shaft opposite the carriage for supporting a video monitor; means for preventing travel of the shaft in a first direction between the stowed and deployed positions; and means for selectively disengaging the preventing means, wherein the preventing means includes a latch for engaging the carriage.

7. The support of claim 6, wherein the selectively disengaging means includes a button operatively connected to the latch for pivoting the latch to disengage from the carriage, wherein disengagement of the latch from the carriage allows the shaft to move between the stowed and deployed positions.

8. A video monitor support movable between stowed and deployed positions, comprising: a base attachable to a surface; a carriage fixed to the base and including a shaft extendible between the stowed and deployed positions;

means for applying a constant linear force to the shaft between the stowed and deployed positions; and a mount fixed to the shaft opposite the carriage for supporting a video monitor, wherein the constant linear force means includes a rail operatively engaging the carriage, and a constant force spring disposed near an end of the rail, operatively connected to the carriage for pulling the carriage along the rail, moving the shaft between the stowed and deployed positions.

9. A video monitor support movable between stowed and deployed positions, comprising: a base attachable to a surface; a carriage fixed to the base and including a shaft extendible between the stowed and deployed positions; means for applying a constant linear force to the shaft between the stowed and deployed positions; and a mount fixed to the shaft opposite the carriage for supporting a video monitor, wherein the constant linear force means includes a rail connected to a side of the housing and operatively engaging the carriage, and a constant force spring connected to the housing near an end of the rail, operatively connected to the carriage for pulling the carriage along the rail, moving the shaft between the stowed and deployed positions, and wherein the shaft is disposed within a housing having an open end in the stowed position, the shaft extending through the open end of the housing in the deployed position.

10. The support of claim 9, wherein the constant linear force means includes a brake for controlling speed of the carriage along the rail as the shaft travels between the stowed and deployed positions.

11. A video monitor support movable between stowed and deployed positions, comprising: a base attachable to a surface; a carriage fixed to the base and including a shaft extendible between the stowed and deployed positions; means for applying a constant linear force to the shaft between the stowed and deployed positions; and a mount fixed to the shaft opposite the carriage for supporting a video monitor; and a spring strap clutch disposed between the mount and the shaft to resist movement of the mount relative to the shaft.

12. A video monitor support movable between stowed and deployed positions, comprising: a base attachable to a surface; a carriage fixed to the base and including a shaft extendible between the stowed and deployed positions; means for applying a constant linear force to the shaft between the stowed and deployed positions; a mount fixed to the shaft opposite the carriage for supporting a video monitor; and a spring strap clutch disposed between the shaft and the carriage to resist movement of the shaft relative to the carriage.

13. A video monitor support movable between stowed and deployed positions, comprising: a base attachable to a surface; a carriage fixed to the base and including a shaft extendible between the stowed and deployed positions; means for applying a constant linear force to the shaft between the stowed and deployed positions; and a mount fixed to the shaft opposite the carriage for supporting a video monitor, wherein the constant linear force means including a rolled spring and a spring drum operatively connected to the carriage that cooperate to position the shaft between the stowed and deployed positions as the spring, attached on one end to the spring drum, rolls about the spring drum.

14. A video monitor support movable between stowed and deployed positions, comprising: a base attachable to a surface; a carriage fixed to the base and including a shaft extendible between the stowed and deployed positions; a rail operatively engaging the carriage; a constant force spring disposed near an end of the rail, operatively connected to the carriage for pulling the carriage along the rail, moving the shaft between the stowed and deployed positions; means for preventing travel of the shaft in a first direction between the stowed and deployed positions; means for selectively disengaging the preventing means; and a mount fixed to the shaft opposite the carriage for supporting a video monitor.

15. The support of claim 14, including a brake for controlling speed of the carriage along the rail as the shaft travels between the stowed and deployed positions.

16. The support of claim 14, wherein the preventing means includes a latch for engaging the carriage, and the selectively disengaging means includes a button operatively connected to the latch for pivoting the latch to disengage from the carriage, wherein disengagement of the latch from the carriage allows the shaft to move between the stowed and deployed positions.

17. The support of claim 14, wherein the shaft is disposed within a housing having an open end in the stowed position, the shaft extending through the open end of the housing in the deployed position, the rail is connected to a side of the housing, and the constant force spring is connected to the housing near the end of the rail.

18. The support of claim 14, including a spring strap clutch disposed between the mount and the shaft to resist movement of the mount relative to the shaft, and a spring strap clutch disposed between the shaft and the carriage to resist movement of the shaft relative to the carriage.

19. The support of claim 14, wherein the constant force spring comprises a rolled spring and a spring drum operatively connected to the carriage that cooperate to position the shaft between the stowed and deployed positions as the spring, attached on one end to the spring drum, rolls about the spring drum.

20. A video monitor support movable between stowed and deployed positions, comprising: a base attachable to a surface; a carriage fixed to the base and including a shaft extendible between the stowed and deployed positions; a rail operatively engaging the carriage; a constant force spring including a rolled spring and a spring drum operatively connected to the carriage, the rolled spring and spring drum cooperating to pull the carriage along the rail and move the shaft between the stowed and deployed positions as the spring, attached on one end to the spring drum, rolls about the spring drum; a latch engaging the carriage to prevent travel of the shaft in a first direction between the stowed and deployed positions; a button operatively connected to the latch for selectively disengaging the latch from the carriage by causing the latch to pivot and disengage from the carriage when the button is pressed, and wherein disengagement of the latch from the carriage allows the shaft to move between the stowed and deployed positions; a mount fixed to the shaft opposite the carriage for supporting a video monitor; a brake for controlling speed of the carriage along the rail as the shaft travels between the stowed and deployed positions; a spring strap clutch disposed between the mount and the shaft to resist movement of the mount relative to the shaft; and a spring strap clutch disposed between the shaft and the carriage to resist movement of the shaft relative to the carriage; wherein the shaft is disposed within a housing having an open end in the stowed position, the shaft extending through the open end of the housing in the deployed position, the rail is connected to a side of the housing, and a portion of the constant force spring is connected to the housing near the end of the rail.

* * * * *